United States Patent [19]
Lathrop

[11] Patent Number: 6,065,946
[45] Date of Patent: *May 23, 2000

[54] INTEGRATED CONTROLLER PUMP

[75] Inventor: Raymond D. Lathrop, Northridge, Calif.

[73] Assignee: Servo Magnetics, Inc., Canoga Park, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/887,535

[22] Filed: Jul. 3, 1997

[51] Int. Cl.$^7$ .................................................... F04B 17/00
[52] U.S. Cl. ..................... 417/423.14; 417/17; 417/42; 417/44.1; 417/32; 310/43
[58] Field of Search ................................. 417/17, 32, 42, 417/44.1, 423.7, 423.14; 310/43, 45

[56] References Cited

U.S. PATENT DOCUMENTS

| | | | |
|---|---|---|---|
| 5,023,531 | 6/1991 | Altemose et al. | 318/471 |
| 5,096,390 | 3/1992 | Sevrain et al. | |
| 5,197,865 | 3/1993 | Sevrain et al. | |
| 5,219,276 | 6/1993 | Metzner et al. | 417/423.7 |
| 5,376,866 | 12/1994 | Erdman | 318/254 |
| 5,644,178 | 7/1997 | Halm | 310/43 |
| 5,670,852 | 9/1997 | Chipperfield et al. | 318/254 |
| 5,714,814 | 2/1998 | Marioni | 417/423.7 |
| 5,769,069 | 6/1998 | Caffell | 417/356 |

FOREIGN PATENT DOCUMENTS

| | | | |
|---|---|---|---|
| 979009 | 1/1965 | United Kingdom | 310/43 |

*Primary Examiner*—Timothy S. Thorpe
*Assistant Examiner*—Cheryl J. Tyler
*Attorney, Agent, or Firm*—Elliott N. Kramsky

[57] ABSTRACT

A d.c. controller pump includes electronic control mechanisms that permit regulated control within a fluid flow system. A pump head is coupled to a housing allowing the fluid to infiltrate the region surrounding a permanent magnet rotor. Stator windings and control electronics fixed to a plurality of printed circuit boards are isolated from the fluid by means of a solid body that encapsulates the stator windings and seals the rear of the cavity. Hall effect sensor-generators and other assemblies are fixed within the solid body to enhance integrity and reduce parts count. Associated electronics includes a readily-removable circuit board for housing auxiliary electronic functions. The board is mounted in parallel at the rear of the pump housing with boards of sensor and controller electronics. The auxiliary function electronics pump configurations enable both fixed and variable speed operation in accordance with fluid flow system design and parameters.

28 Claims, 5 Drawing Sheets

INTEGRATED CONTROLLER PUMP

BACKGROUND

1. Field of the Invention

The present invention relates to apparatus suitable for regulating fluid flow. More particularly, this invention relates to a programmable pump/controller.

2. Description of the Prior Art

A compact pump is disclosed in United States patents of Servain et al. entitled "Pump Assembly With Integral Electronically Commutated Drive System" (U.S. Pat. No. 5,096, 390) and "Integral Electronically Commutated Drive System" (U.S. Pat. No. 5,197,865). The device of those patents discloses a magnetically torque-coupled pump that includes a number of advantageous features. It offers the advantages of an integrated assembly in which the pump drive shaft is coextensive with the shaft of the rotor of the associated electrical drive motor. As such, and in contrast to pumps of the "direct drive" type, it does not require dynamic or motor bearing seals that are known to impose excessive frictional loading and thus reduce useful life through contamination and seal failure. Finally, the disclosed pump is desirably brushless, eliminating the need for a spring-biased contact that could otherwise act as a source of intermittent failure.

While offering compactness and freedom from bearing-induced friction, the integration of pump and motor requires structures dedicated to preventing damage to electronic components through the migration of fluid into areas left "unprotected" by the absence of such bearing seals. Pump complexity and cost is thereby increased through the multiplication of parts requiring assembly and maintenance which add potential sources of failure.

Pumps of the above-described type are employed in numerous systems and applications. Some useful applications are found in the fields of facilities management, process control and like technologies. A representative use for a pump of the above-described or similar type is illustrated in FIG. 1, a schematic view of a radiant heating system in which a flow of heated water is supplied to a panel 10 for controlling temperature within a building.

Figure 1:
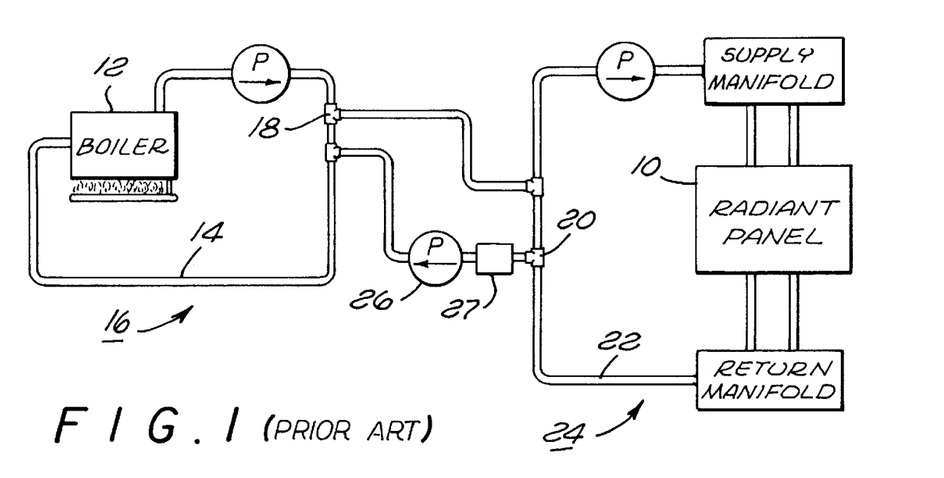
FIG. 1 is a schematic diagram of a radiant heating system for a structure in accordance with the prior art.

Referring to the prior art radiant heating system of FIG. 1, optimum operation for efficiency and economy of use requires that the flow throughout the closed system take into account multiple factors. While such factors may vary from one specific application to another, one advantageous protocol takes into account the temperature of water heated by means of a boiler 12 that circulates within the piping 14 of a primary heating circuit 16. A useful point for ascertaining temperature in the system of FIG. 1, and thereby locating an appropriate sensor, is adjacent the tee joint 18. Another critical point in the system of FIG. 1 lies at the tee joint 20 located at the interface between the primary heating circuit 16 and the piping 22 of a secondary heating circuit 24 that includes the radiant heating panel 10. A third sensor may be appropriately located outside the building for measuring ambient temperature.

Optimum efficiency within the above protocol requires continual consideration and review of the various sensor outputs. For example, it may be inefficient for any flow of heated fluid to occur from the primary heating circuit 16 into the secondary heating circuit 24 before the boiler 12 has sufficiently heated the fluid.

Conventionally, systems of the above type, as well as much more complex systems, are regulated by means of a constant-speed pump 26 that may act in conjunction with a calibrated venturi valve 27 for setting associated gate valves whereby the flow rate is adjustable to maintain a desired temperature. Such arrangements are quite expensive in terms of hardware as the cost of the calibrated venturi valve may be at least equal to that of a pump 26 such as the device of the above-referenced patents. Further, additional time and expense may be incurred in adjusting the venturi valve 27 for cooperature utilization with the pump 26.

SUMMARY OF THE INVENTION

The foregoing and other shortcomings of the prior art are addressed by the present invention that provides, in a first aspect, an integrated d.c. controller pump. Such pump includes a pump head having spaced-apart inlet and outlet ports and means for controlling a flow of fluid therebetween. A solid body of generally-cylindrical shape is provided. A rotor is fixed to the means for controlling fluid flow. Such rotor includes a plurality of radially-arranged permanent magnets.

The body has a closed coaxial interior cylindrical chamber adapted to receive the rotor. A stator is encapsulated within the body.

In a second aspect, the invention provides an integrated d.c. controller pump that includes a pump head having spaced-apart inlet and outlet ports and means for controlling a flow of fluid therebetween. A substantially cylindrical rotor is fixed to the means for controlling fluid flow. The rotor includes a plurality of radially-arrayed permanent magnets.

A stator includes a plurality of windings. The stator is coaxial with the cylindrical surface of the rotor. Means are provided in communication with the rotor and with the stator windings for sensing at least one predetermined variable and generating a responsive d.c. signal so that the speed of rotation of the rotor is adjustable in accordance with a predetermined protocol.

In a third aspect, the invention provides an improvement in a radiant heating system of the type that includes a boiler for heating fluid circulating within a first closed conduit defining a primary heating circuit and a second closed conduit defining a secondary heating circuit. The secondary heating circuit includes at least one radiant heating panel. A third conduit defines a fluid flow path between the primary and secondary heating circuits. Means are provided for sensing at least one predetermined environmental variable.

The improvement of the invention includes a variable speed d.c. pump located within the third conduit for regulating the flow of fluid from the primary heating circuit into the secondary heating circuit. The d.c. pump includes a rotor and at least one stator winding arranged to induce rotation. Means for regulating the flow of fluid through the pump is fixed to the rotor. Means are provided for sensing the speed of the rotor.

The pump includes (i) means for sensing the values of the speed of rotation and of at least one predetermined environmental variable, (ii) means for inputting an evaluation criterion and (iii) means for receiving the aforesaid values and evaluation criterion and generating a d.c. control signal in response for application to the windings so that the speed of rotation is continually adjustable in response to at least one sensed value and the evaluation criterion.

In a fourth aspect, the invention provides an improvement in a closed multi-station fluid flow system of the type that includes a plurality of lines joined to common return and feed lines. A predetermined flow rate is apportioned between the plurality of lines with a maximum rate associated with each.

The improvement provided by this aspect of the invention includes a variable speed d.c. pump located in each of the plurality of lines for regulating the flow of fluid therein. Each of the d.c. pumps includes a rotor and at least one stator winding arranged to induce rotation. Means for regulating the flow of fluid through the pump are fixed to the rotor. Means are provided for sensing the speed of the rotor and the value of current flow within the stator winding(s).

Each of the pumps includes (i) means for receiving the sensed values of speed of rotation and stator current, (ii) means for inputting the value of the maximum flow rate and (iii) means for generating a d.c. control signal in response to the sensed values and the value of maximum flow rate for application to the stator windings so that the speed of the rotor is continuously adjustable in response to flow conditions throughout the fluid flow system in such a way that the maximum flow rate of each line is not exceeded.

The preceding and other features and advantages of the present invention will become further apparent from the detailed discussion that follows. Such discussion is accompanied by a set of drawing figures. Numerals of the drawing figures, corresponding to those of the written text, point-to the features of the invention with like numerals referring to like features throughout both the drawing figures and the written text.

DETAILED DESCRIPTION OF THE PREFERRED EMBODIMENT

Figure 2:
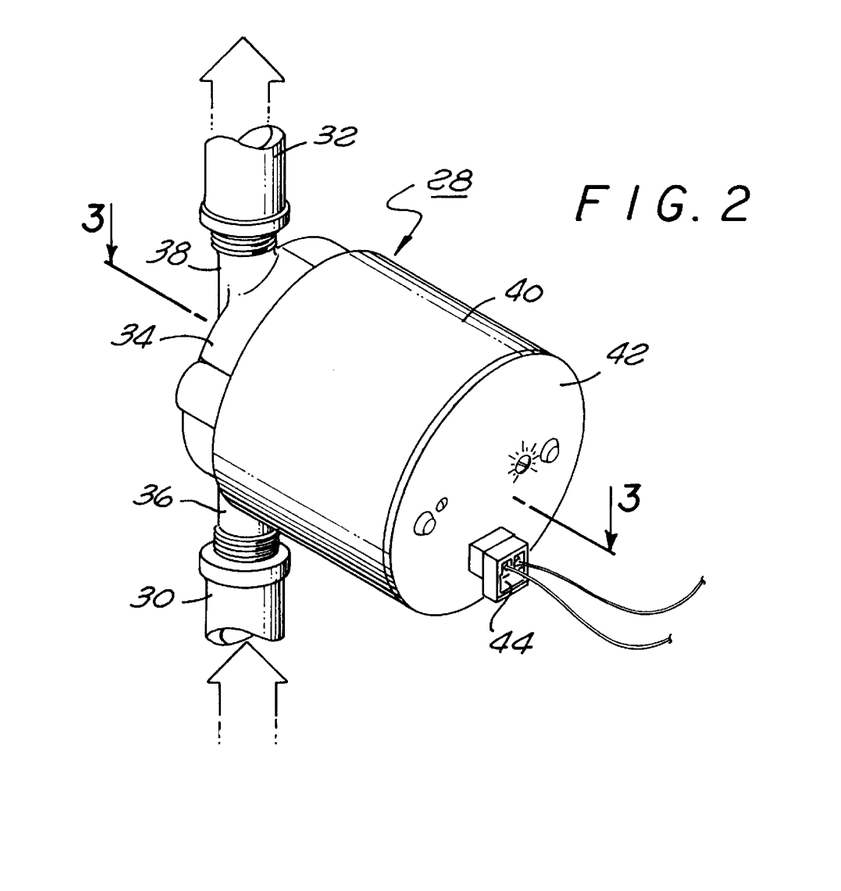
FIG. 2 is a perspective view of a metering pump in accordance to the invention engaged within a fluid flow conduit.

FIG. 2 is a perspective view of a metering pump 28 in accordance with the invention engaged for use within a fluid flow conduit comprising an inlet line 30 and an outlet line 32. Each of the inlet and outlet lines 30 and 32 is affixed to and communicates with the interior of a pump head 34. The pump head 34 may house any of a number of well-known types of pump mechanisms whereby a controllable flow of fluid through the lines 30 and 32 is obtained by operation of the pump mechanism upon the fluid as it passes between spaced-apart inlet and outlet ports 36 and 38. Numerous well-recognized types of pump mechanisms may be employed in accordance with the present invention including, for example, centrifugal pumps, vane pumps, gear pumps, etc.

A controllable motor mechanism is incorporated within the metering pump 28 of the invention. It will be seen later that the controllable nature of the integrated pump-motor mechanism permits its advantageous employment within numerous fluid flow systems. While impossible to enumerate in their entireties, systems incorporating a metering pump 28 in accordance with the invention may benefit from the flexibility of the electronic servo system configurations provided by the invention. In general, such closed-loop or servoed operation of the pump 28 is obtained by "reading" the real time performance of the pump from measurable parameters such as motor speed $\omega$ and stator current $I_s$, then adjusting pump output by updating electrical inputs to the motor. The motor, and, thus, the pump 28, is programmable, permitting it to be selectively configured for a number of different desired modes of operation.

The motor and associated electronics are located within a cylindrical housing 40. The rear of the housing 40 is closed by means of a cap 42 having an associated connector 44. The cap 42 is engageable to a circular printed circuit board that houses electronic functions unique to the present invention. The electronics of the adjacent circuit board interact with otherwise-conventional pump electronics suitable for constant speed operation. The contribution of the additional electronic capabilities to the operation of the present invention will become further apparent from the discussion that follows.

Figure 3:
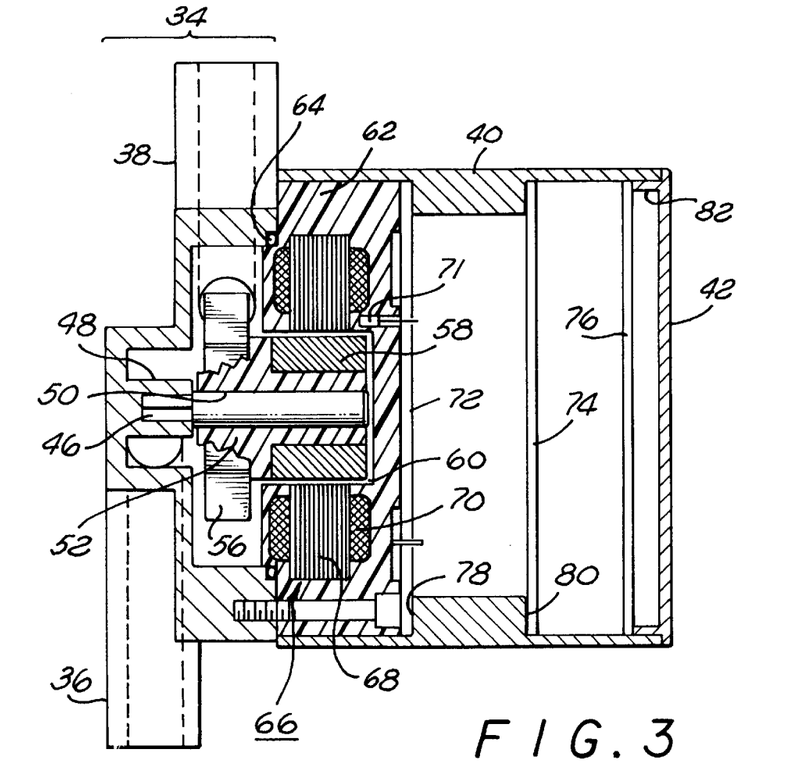
FIG. 3 is a side elevation view in cross-section of the metering pump of the invention taken at line 3—3 of FIG. 2.
Figure 4:
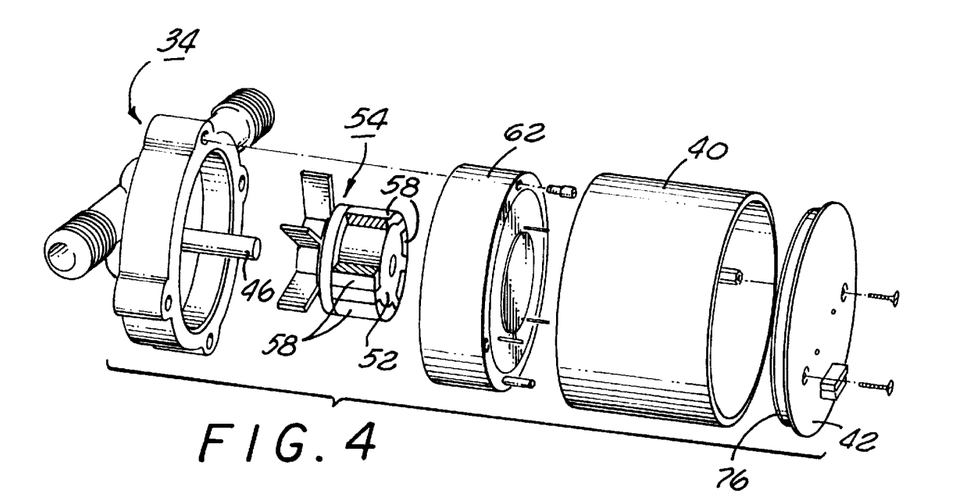
FIG. 4 is an exploded perspective view of the metering pump of the invention.

FIG. 3 is a side elevation view in cross-section of the metering pump 28 of the invention taken at line 3—3 of FIG. 2 while FIG. 4 is a somewhat-simplified exploded perspective view. Taken together, the two views disclose the essential mechanical structures and relationships of the elements of the metering pump 28.

A stationary shaft 46 is press-fit into a central hub 48 of the pump head 34. The shaft 46 is rotatably received within a central bore 50 of a generally-cylindrical rotor 52. An impeller 54, comprising a plurality of radially-directed vanes 56, is fixed to the end of the rotor, which may be fabricated of molded NYLON or other nonmagnetic material.

A plurality of permanent magnet dipoles, such as the representative magnet 58, is fixed about the periphery of the rotor 52. The magnets may comprise, for example, barium ferrite material with appropriate encapsulation and sheathing. The rotor 52 with peripheral magnets is received within a cylindrical cavity 60 defined at the interior of a solid body 62. The body 62, which is sealably fixed to the pump head 34 by means of an o-ring 64, is preferably formed of EPOXY and offers a number of features that provide significant operational and manufacturing advantages over other inductively-driven motor-pumps such as those taught by the above-defined United States patents. By virtue of its cylindrical exterior, integral nonmagnetic composition and accommodation of a central cylindrical closed cavity 60, the solid body 62 effectively fills the section within the housing 40 dedicated to the electromechanical motor-pump mechanisms with the exception of (1) the rotor 52, including associated permanent magnets such as the representative magnet 58, and (2) the small (about 1/64 inch) clearance that exists between the exterior surface of the rotor 52 and the interior surface of the cylindrical closed cavity 60.

The clearance between rotor 52 and the interior of the body 62 is filled with fluid during operation of the pump due to the absence of the dynamic bearing seals, motor shaft bearings or shaft seals that introduce friction in motors of the direct and magnet drive types. As such, the central cylindrical closed cavity 60 of the body 62 effectively contains the fluid that necessarily infiltrates into regions adjacent electronic elements and interconnections. A discussion of such elements, including means for driving the rotor 52, sensing motor speed and other variables and powering and controlling the metering motor will follow. In each instance it will become apparent that the design and arrangement of the solid body 62 serves an essential function in providing a means for preserving the integrity of such essential electronic elements while at the same time simplifying fabrication, lowering maintenance, enhancing resistance to environmental degradation and thereby providing a pump of greater reliability and economy. For example, the pump of the referenced United States patents employs a metallic cup-like enclosure for sealing system electronics from fluid infiltration. The resultant structure is less sturdy and durable than the present device in which the solid body 62 provides encapsulation—and, thus, environmental isolation—of sensitive electronics, reduces parts count as the molded piece is designed to incorporate a number of functions of separate parts of prior art pumps, and removes a metallic element that can act as a source of distorting eddy currents.

Referring once again to FIGS. 3 and 4, a stator 66 comprising laminations 68 and a representative coil or winding 70, is positioned about the periphery of the central cylindrical cavity 60 and encapsulated within the solid body 62. This is to be contrasted with prior art devices in which the stator is arranged exterior to the above-referenced metallic cup and thereby exposed to free space and attendant environmental effects such as vibration. Complex mounting arrangements of the patented device require that the stator laminations fill the space between the interior of the pump housing and the outer surface of the cup. In contrast, the molded piece 62 provides an EPOXY matrix in which the stator is located and suitably positioned. The dimensioning of the solid body 62 replaces that of the referenced device insofar as securing a stable structural fit within the electromechanical section of the metering pump 28. Thus, the dimensions of the stator of the present invention may be chosen solely in accordance with desired motor performance and independent of the configuration of the other elements of the device.

In a preferred embodiment, an even number of stator windings (e.g. six) is employed to prevent asymmetrical side loading of the permanent magnet rotor 52. A plurality of more than two of stator windings is employed to assure unambiguous control of sense of rotation. Further, the number of permanent magnet dipoles of the rotor 52 should differ from the number of stators to assure that simultaneous alignment of rotor poles and stator windings can never occur.

A plurality of Hall effect generators, such as the representative generator 71, are symmetrically arranged with respect to the axis of rotation of the rotor 52. Each generator or sensor 71 is fitted and securely mounted within the molded piece 62 and appropriately positioned for measuring the angular position of the rotor. The sensors are wired together to generate a series of pulses (TACH signal) indicative of the speed of rotation. The operation of such sensors, as well as their application to the measurement of speed of rotation of a rotor within a switching electrical field, are well understood by those skilled in the art.

In the present invention, the accuracy of the useful outputs of the Hall effect sensor-generators is enhanced by their positioning within the solid body 62. As in the case of the stator referred to above, encapsulation simplifies and enhances the accuracy of mounting arrangements and protects the sensors from mechanical degradation due to the presence of such environmental factors as stress, dew deposition and vibration that can produce corrosion, mechanical misalignment and other effects that degrade the reliabilities of sensed outputs. In addition, by providing a metallic cup enclosure to contain fluid infiltration and arranging sensors outside the cup, sensor readings in a device in accordance with the prior art patents are subject to the generation of signal-distorting eddy currents at the surface of the metallic cup. In contrast, the molded EPOXY composition of the solid body 62 provides a nonconductive region of well-defined parameters incapable of corrupting sensor output.

The outputs of, and inputs to, the stator and sensors for driving and controlling the operation of the invention are provided by means of electronic circuitry mounted upon circular circuit boards 72, 74 and 76 mounted concentrically within the housing 40 at annular shoulders 78 and 80. A board 76 that provides auxiliary functions which enable the pump 28 to act as a controller is fixed to the cover 42 in spaced-apart relationship, maintained by a peripheral edge flange 82.

Figure 5:
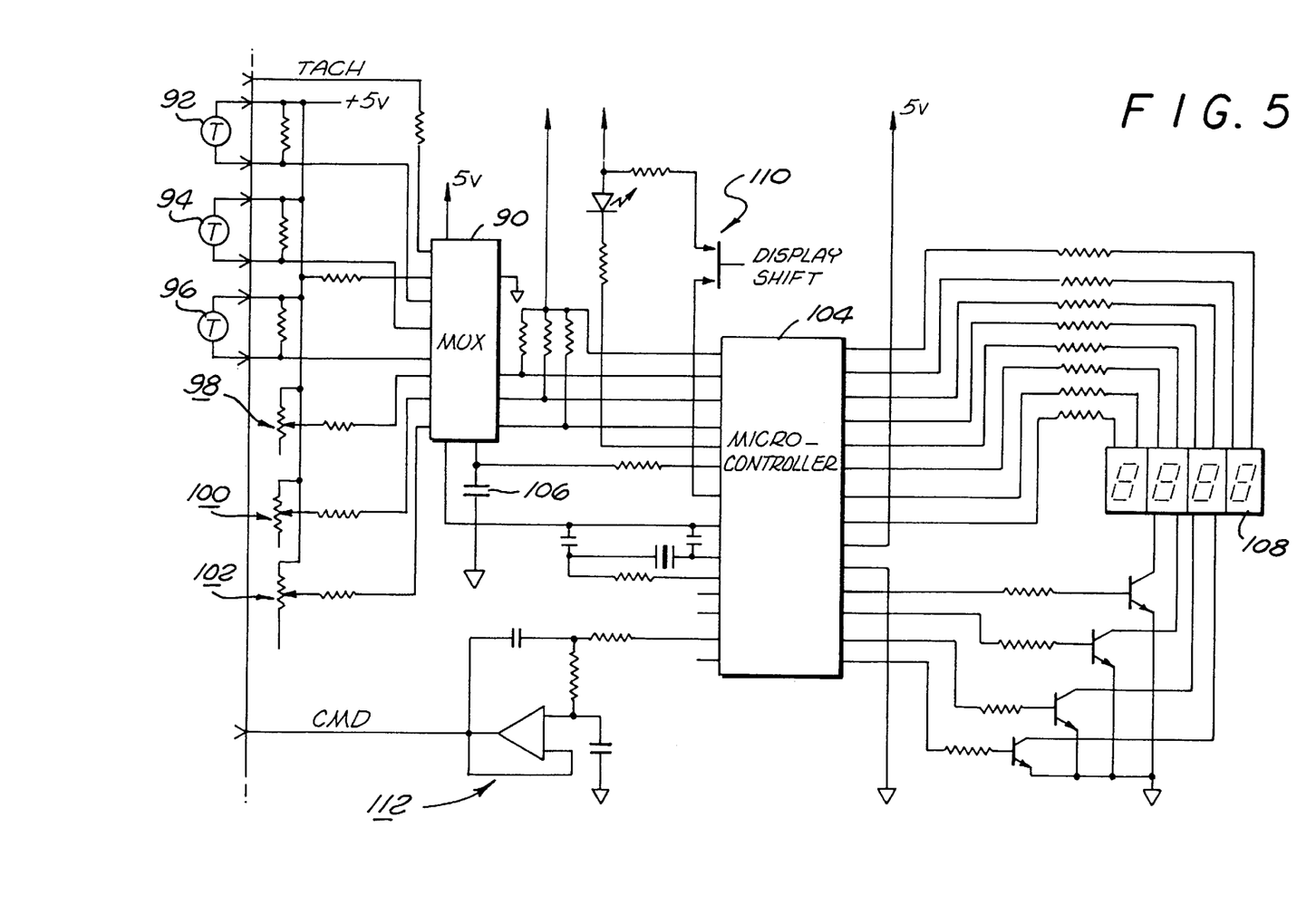
FIG. 5 is an electrical schematic diagram of the electronics located upon the auxiliary function board of the invention configured for use as a controller within the radiant heating system as illustrated in FIG. 1.

FIG. 5 is an electrical schematic diagram of the electronics of the auxiliary function board 76 of the invention. Such electronics is configured for use as a controller within the radiant heating system of FIG. 1. The single pump 28 replaces both the constant speed pump 26 and the calibrated venturi 27 of the prior art configuration. As in the case of the former elements, the pump 28 is located within the line connecting the primary heating circuit 16 to the secondary heating circuit 24 adjacent the common tee 20. Electronics fixed to the circuit boards 72 and 74 perform the recognized functions common to a constant-speed inductively-driven pump including control of the excitation of stator windings, motor speed control, power supply and sensing of rotor speed and position. Such functions are taught, for example, in and with reference to the device of the above-cited United States patents.

Figures 6, 7:
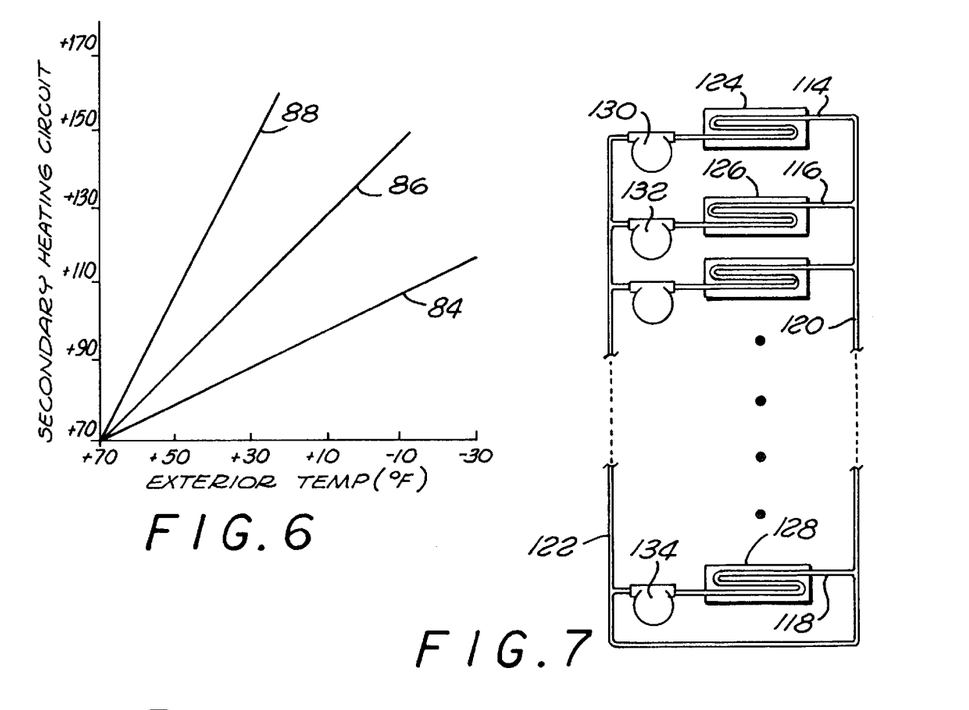
FIG. 6 is a graph illustrating representative heating curves for incorporation into an operational protocol of the radiant heating system of FIG. 1.
FIG. 7 is a schematic diagram of a multi-station fluid flow system configured to include a plurality of metering flow pumps in accordance with the invention.

In the present invention, electronics mounted upon the removable auxiliary function board 76 enables the pump 28 to control the output of the radiant heating panel 10 in such a way as to conform to a predetermined profile or curve such as that of the graph of FIG. 6. The orthogonal axes of the graph of FIG. 6 relate exterior temperature to that of water circulating in the secondary heating circuit 24, it being understood that the ultimate output of the system is the temperature of the radiantly heated interior of the building.

Three heating curves 84, 86 and 88 are plotted on the graph of FIG. 6. Each of such curves plots a fixed ratio between the measured temperatures of the fluid of the secondary heating circuit and of the exterior. As shown, ratios of 0.5 (heating curve 84), 1.0 (heating curve 86) and 2.0 (heating curve 88) are plotted. (It is understood that each of the heating devices 84, 86 and 88 is calibrated with reference to the structure in question. As the ultimate output of the system of FIG. 1 is the temperature of the interior of the structure, each heating curve produces a distinct, predictable interior temperature.)

It is well known that the temperature of water circulating within the secondary heating circuit 24 is a positive function of both the temperature of the water heated by the boiler 12 (and circulating in the primary heating circuit 16) and the rate of flow of fluid, Q. Referring to the schematic of the auxiliary function electronics of FIG. 5 in conjunction with the graph of FIG. 6, one may appreciate the manner in which the auxiliary function electronics allows the pump 28 of the invention to control the radiant heating system of FIG. 1.

Numerous system measurements, generated and received through the conventional electronics of the circuit boards 72 and 74, are input to a multiplexer integrated circuit 90 which may comprise a Model 14051 manufactured by Motorola Corporation. Such inputs include the TACH signal, discussed above, that comprises a series of pulses responsive to the speed of rotation of the rotor 52 (generated from the outputs of the Hall effect generators), linearized values of the measured resistances of thermistors 92, 94 and 96 arranged to sense primary heating circuit, common tee (or "blend point") and exterior temperatures and settable values of potentiometers 98, 100 and 102 respectively. The latter three values relate to the graph of FIG. 6 and are, of course, obtained from devices external to the pump 28. The value of the potentiometer 98 corresponds to a predetermined minimal temperature of the boiler-heated water in the primary circuit 16 for operation of the metering pump 28. The setting of the potentiometer 100 defines the slope of and thereby selects the desired heating curve of FIG. 6 while the potentiometer 102 provides manual override. When the potentiometer 102 is set to its maximum value, this is interpreted at a microcontroller 104 as an instruction that the control strategy for regulating the operation of the pump 28 is to be with reference to the blend point temperature (i.e. the temperature indicated by the thermistor 94), the outside temperature (the value indicated at the thermistor 96) and the selected heating curve (indicated by the setting of the potentiometer 100). Alternatively, should the potentiometer 102 be set to some other, non-maximum resistance value, that value, rather one taken from the heating curve, is the reference temperature to which the water fluid circulating in the secondary heating circuit 24 is regulated. Obviously, the resultant radiantly-heated temperature of the structure will, in the first instance, tend to remain constant while, in the latter instance, it will tend to mirror fluctuations in outdoor temperature.

The values input to the multiplexer 90 are sequentially applied to a timing capacitor 106 with the resultant charge accumulation time applied to a timer within the microcontroller 104 which may comprise, for example, a PIC16C62A RISC computer manufactured by Microchip Corp. The values input to the microcontroller 104 may be viewed on a display 108 whose content is controlled via sequential depression of a switch 110. Both the display 108 and the switch 110 are fixed to the exterior surface of the cap 42 to permit access and visibility while the pump 28 is in use. The microcontroller 106, which is capable of performing thirty-three unique instructions, provides a pulse width modulated signal that is converted to d.c. at a filter 112. The resultant CMD ("command") signal comprises a d.c. level that affects the speed of switching between the stators of the three-phase motor. This signal varies the speed of rotation of the rotor 52 to alter the flow rate Q in such a way that the measured temperature of the fluid flowing within the secondary heating circuit 24 is driven toward the appropriate reference value. As mentioned, the temperature reference is programmed into the pump 28 by the setting of the manual override potentiometer 102. Thus, in contrast to the prior art arrangement of FIG. 1, the speed of the pump 28 is varied so that the ultimate system output (structure heating), rather than motor speed, is tracked. Such capability, a feature of the invention made possible by the electronics of the auxiliary function board 76, enables one to regulate the output of a system in accordance with FIG. 1 without incurring the expense of an additional element (i.e. calibrated venturi). Thus, the invention provides a simple and elegant system controller for a radiant heating system.

The controller pump of the invention enables additional advantages that overcome significant problems commonly encountered in fluid flow systems. FIG. 7 is a schematic diagram of a multi-station fluid flow system configured to include a plurality of metering flow pumps in accordance with the invention.

The fluid flow system consists of a plurality of parallel lines. 114, 116, . . . 118 with shared return and feed lines 120, 122. Each of the parallel lines of the system may be employed, for example, to deliver a flow of fluid to an associated output or utilization device 124, 126, . . . 128. The system of FIG. 7 may be employed to control flows within a large structure or over an area including a number of structures.

Often, a closed fluid flow network such as that illustrated in FIG. 7 will require the maintenance of differing maximum flow rates within the various parallel lines. In the prior art, such a system conventionally employs a single pump for circulating the fluid and individual valves and regulators within each line for independently adjusting flows therein. The setting of the various maximum flow rates may take weeks in a complex system due to the interactions inherent in any closed system. As a result, substantial "downtime" is often encountered in the setup of a new system of the type disclosed in FIG. 7.

Rather than employing a single heavy-duty pump in conjunction with a plurality of settable valves and restrictors, each of the lines 114, 116, . . . 120 includes a single control element, a pump in accordance with the invention. Each of such pumps 130, 132, . . . 134 is programmed for automatically regulating the maximum flow rate through the associated line. Thus, by appropriately programming each pump, one may be assured that blockages and other flow aberrations that may occur over time will not render the entire system out of calibration and thereby require, as in the case of prior art systems, significant downtime while it is re-calibrated.

Figure 8:
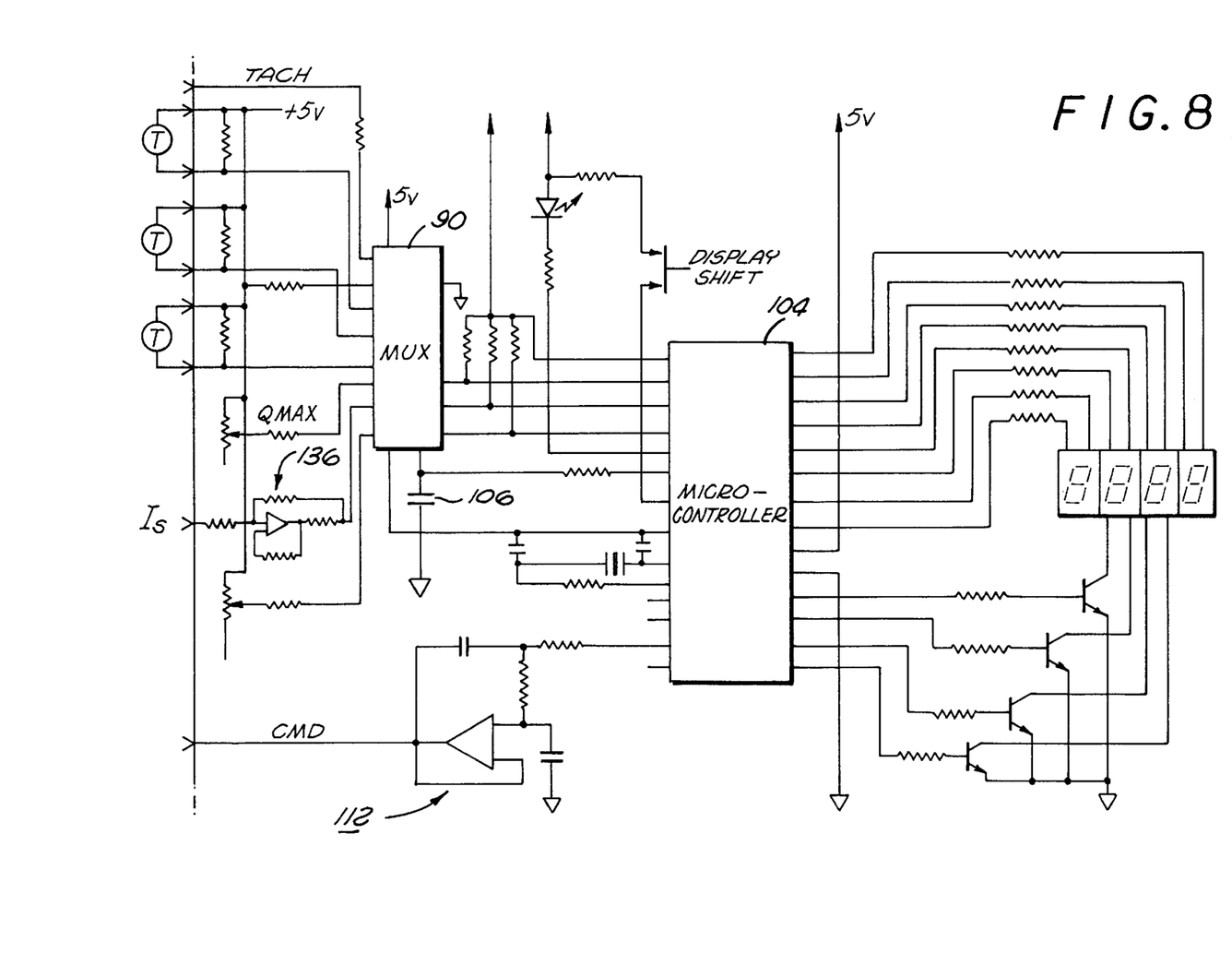
FIG. 8 is an electrical schematic diagram of the auxiliary function board of a metering pump configured for use in the multi-station fluid flow system of FIG. 7.

FIG. 8 is a schematic diagram of the auxiliary function board of a metering pump configured for use in the multi-station fluid flow system of FIG. 7. The reconfiguration of the auxiliary function board can be seen to involve the inputting of an amplified value of $I_s$, the stator current. The value of $I_s$, conventionally measured for controlling a constant-speed motor and therefore made available through the electronics of the circuit boards 72 and 74, is amplified at an operational amplifier 136 and provided as an input to the multiplexer 90. (While a number of the inputs for use in the radiant heating system according to FIG. 1 are shown in FIG. 7, only two, the TACH signal and $Q_{max}$ (determined by the setting of a potentiometer 138), are relevant to the control of the multi-station device of FIG. 7.)

As discussed with reference to the operation of the circuitry of FIG. 5, the values of the TACH signal and $I_s$ are output from the multiplexer 90 and subsequentially input to the microcontroller 104 as timed values derived from charging of the capacitor 106. It is readily understood from Euler's impeller equations that the flow rate Q output by a motor such as that of the current invention is a function of stator current and motor speed. More specifically:

$Q = (K_t/r\gamma)(I_s/f(\omega r))$ where:

$K_t$=motor torque
r=outside radius of impeller
γ=density of fluid
ω=motor speed As the values of $K_t$, r, and γ are constants which may be programmed into the microcontroller 104, and as the TACH signal provides a measure of ω, each of the pumps 130, 132, . . . 134 continuously receives all necessary information for outputting an appropriate CMD signal so that the preset $Q_{max}$ of any motor of the arrangement of FIG. 7 will not be exceeded regardless of changes that may occur throughout the system over time.

Figure 9:
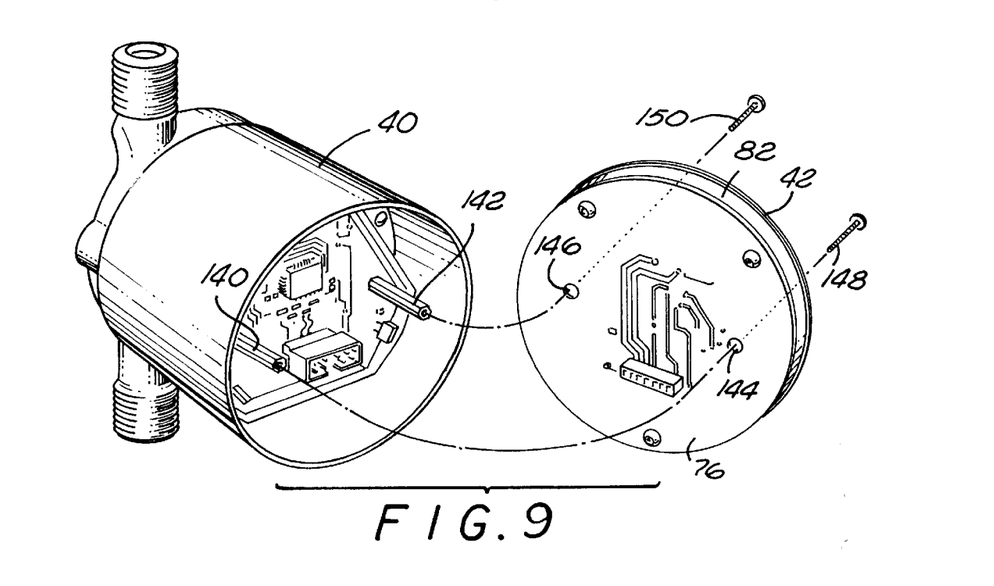
FIG. 9 is a perspective view of the invention generally in accordance with FIG. 2 for illustrating the ready removal and substitution of auxiliary function board electronics for facilitating setup and operational flexibility.

FIG. 9 is a perspective view of the pump 28, taken from the rear and generally in accordance with FIG. 2. This view illustrates the arrangements of the invention that facilitate ready conversion of the pump 28 to constant speed applications, enhancing the flexibility of the device. As mentioned earlier, the requisite electronics for obtaining the necessary motor outputs and deriving responsive signals for the multitude of constant-speed uses to which the pump 28 may be applied are mounted solely upon the printed circuit boards 72 and 74. Such electronics may include, for example, a brushless d.c. motor controller such as that commercially available from Motorola Corp. under product designation MC 33035.

As mentioned earlier, the auxiliary function electronics is mounted exclusively upon the circuit board 76 that is mounted adjacent and abutting the rear cap 42. Posts 140, 142 extend parallel to the axis of rotation of the cylindrical housing 40 and pass through internal apertures 144, 146 respectively of the circuit board 76. A like pair of apertures (not shown) in the cap 42 are aligned therewith. The posts 140, 142 are hollow and internally threaded to receive fasteners 148, 150 through such apertures in the cap 42. As earlier pointed out, a peripheral edge flange 82 maintains predetermined spacing between the surface of the board 76 and the cap 42. The aforesaid structure enables the user to convert the motor 28 between constant and variable speed operations in a simple and rapid manner involving the selective insertion or removal of the auxiliary function board 76. Likewise, the pump 28 may be distributed in both variable speed and constant speed versions, affording a uniformity of elements and structures that permits simplified logistical support and, thus enhances product maintenance.

While this invention has been described with reference to its presently-preferred embodiment, it is not limited thereto. Rather, the invention is limited only insofar as it is described by the following set of patent claims and includes within its scope all equivalents thereof.

What is claimed is:

1. A centrifugal integrated d.c. controller pump comprising, in combination:
   a) a pump head having spaced-apart inlet and outlet ports and an impeller for controlling a flow of fluid therebetween;
   b) an integral solid body of continuous molded, nonmagnetic material having a generally-cylindrical shape and a hollow interior, said body encapsulating a stator;
   c) a rotor fixed to said means for controlling fluid flow, said rotor including a plurality of radially-arrayed permanent magnets;
   d) the hollow interior of said solid body of molded, nonmagnetic material defining a coaxial interior cylindrical chamber permanently closed at one end and open at the opposed end for receiving said rotor;
   e) a hollow cylindrical housing; and
   f) the exterior surface of said body contacting the interior surface of said housing throughout the length of said body.

2. A pump as recited in claim 1 wherein said stator further includes:
   a) a plurality of windings; and
   b) said windings are arranged adjacent the surface of said interior cylindrical chamber.

3. A pump as recited in claim 1 wherein said solid body is of molded EPOXY fabrication.

4. A pump as recited in claim 1 further comprising:
   a) at least one board having electronic circuitry mounted thereon;
   b) said at least one board being located within a rear section of said housing; and
   c) the closed end of said solid body being intermediate said pump head and said at least one board.

5. A pump as recited in claim 4 further comprising:
   a) a plurality of circuit boards including an auxiliary board located within said rear section of said housing;
   b) said auxiliary circuit board including electronic circuitry functionally limited to generating a signal for adjusting the speed of said pump in accordance with a predetermined protocol to thereby selectively vary the flow rate output of said pump; and
   c) a removable end cap for fixation to and closure of the rear of said housing; and
   d) said auxiliary circuit board being located adjacent said end cap to facilitate reconfiguration of operation of said pump.

6. A pump as recited in claim 5 wherein said boards are mounted in parallel to one another within said rear section of said housing.

7. A pump as recited in claim 1 further including a plurality of rotor motion sensors fixed within said solid body.

8. An integrated d.c. controller pump comprising, in combination:
   a) a pump head having spaced-apart inlet and outlet ports and an impeller for controlling a flow of fluid therebetween;
   b) a substantially cylindrical rotor fixed to said impeller, said rotor including a plurality of radially-arrayed permanent magnets;
   c) a stator including a plurality of windings, said stator being coaxial with the cylindrical surface of said rotor;
   d) a programmable microcontroller for receiving output signals from said rotor and said stator windings;
   e) means for sensing at least one environmental variable and providing a responsive signal to said microcontroller;
   f) means for inputting a predetermined operational protocol to program said microcontroller; and
   g) said microcontroller being programmed to generate a pump flow rate and corresponding signal in response to said output and environmental variable signals for adjusting the speed of rotation of said rotor in accordance with said flow rate.

9. A pump as recited in claim 8 further including:
   a) a cylindrical housing;
   b) a plurality of circuit boards including an auxiliary circuit board;
   c) said microcontroller and said means for inputting being fixed to said auxiliary circuit board;

d) said auxiliary circuit board being located at the end of said housing remote from said pump head; and e) said other at least one circuit board including apparatus for constant rotor speed operation.

10. An integrated d.c. controller pump as defined in claim 8 further including:

a) an integral solid body of continuous molded, nonmagnetic material having a generally-cylindrical shape and a hollow interior, said body encapsulating said stator;

b) the hollow interior of said solid body of molded, nonmagnetic material defining a coaxial interior cylindrical chamber permanently closed at one end and open at the opposed end for receiving said rotor;

c) a hollow cylindrical housing; and d) the exterior surface of said body contacting the interior surface of said housing throughout the length of said body.

11. A pump as recited in claim 8 wherein said d.c. signal is applied to said plurality of stator windings.

12. A pump as recited in claim 11 further including:

a) a plurality of Hall effect generators for sensing angular rotor position; and b) said generators provide one of said output signals.

13. A pump as recited in claim 12 wherein said means for inputting a predetermined operational protocol to said microcontroller comprises at least one potentiometer.

14. A pump as recited in claim 13 further including:

a) a closed cylindrical solid body of molded nonconductive material having an interior cylindrical chamber; and b) said stator windings being encapsulated within said solid body.

15. A pump as defined in claim 14 wherein said windings are arrayed radially adjacent the surface of said interior cylindrical chamber.

16. A pump as defined in claim 15 wherein said generators are fixed within said solid body.

17. In a radiant heating system of the type that includes a boiler for heating fluid within a first closed conduit defining a primary heating circuit, a second closed conduit defining a secondary heating circuit including at least one radiant heating panel, a third conduit defining a fluid flow path between said primary and secondary heating circuits and means for sensing at least one environmental variable, the improvement comprising, in combination:

a) a variable speed d.c. pump located within said third conduit for regulating the rate of flow of fluid from said primary heating circuit into said secondary heating circuit;

b) said d.c. pump including a rotor and at least one stator winding arranged to induce rotation thereof;

c) means for regulating the flow of fluid through said pump fixed to said rotor;

d) means for sensing the speed of said rotor; and e) said pump further including (i) a microcontroller for receiving signals responsive to said speed of rotation and said at least one environmental variable, (ii) at least one potentiometer for inputting an evaluation criterion and (iii) said microcontroller being arranged to calculate a flow rate in response to said signals and said evaluation criterion and to generate a control signal in response to said calculated flow rate for application to said windings to adjust the speed of rotation of said rotor to thereby obtain said flow rate.

18. A radiant heating system as recited in claim 17 further characterized in that said means for sensing comprises a plurality of Hall effect generators.

19. A radiant heating system as recited in claim 18 wherein at least one thermistor provides said signal responsive to at least one environmental variable.

20. A radiant heating system as recited in claim 19 further including:

a) a pump housing having a rear section;

b) a plurality of circuit boards including an auxiliary circuit board located within said rear section of said housing;

c) said plurality of potentiometers, said microcontroller and said means for receiving being fixed to said auxiliary function circuit board; and d) said auxiliary circuit board being removably fixed within said rear section of said housing adjacent the end thereof to facilitate reconfiguration of operation of said pump.

21. A radiant heating system as recited in claim 19 including a first potentiometer for selectively inputting the selection of one of a fixed or an exterior-temperature dependent temperature profile for fluid within said secondary heating circuit.

22. A radiant heating system as defined in claim 17 wherein said pump further includes:

a) a pump head having spaced-apart inlet and outlet ports and an impeller for controlling a flow of fluid therebetween;

b) an internal solid body of continuous molded, nonmagnetic material having a generally-cylindrical shape and a hollow interior, said body encapsulating said stator;

c) said rotor being fixed to said impeller and including a plurality of radially-arrayed permanent magnets;

d) the hollow interior of said body of molded, nonmagnetic material defining a coaxial interior cylindrical chamber permanently closed at one end and open at the opposed end for receiving said rotor;

e) a hollow cylindrical housing; and f) the exterior surface of said body contacting the interior surface of said housing throughout the length of said body.

23. In a closed multistation fluid flow system of the type that includes a plurality of lines joined to common return and feed lines and in which a predetermined total flow rate is apportioned between said plurality of lines with a maximum rate associated with each of said lines, the improvement comprising, in combination:

a) a variable speed d.c. pump located within each of said plurality of lines for regulating the rate of flow of fluid therein;

b) each of said d.c. pumps including a rotor and at least one stator winding arranged to induce rotation thereof;

c) means for regulating the flow of fluid through said pump fixed to said rotor;

d) means for sensing the speed of said rotor and the value of current flow within said at least one stator winding; and e) each of said pumps including (i) a microcontroller for receiving said sensed values of speed of rotation and stator current, (ii) means for inputting the value of said maximum flow rate to said microcontroller and (iii) said microcontroller being arranged to calculate a flow rate in response to said inputs and to generate a d.c. control signal in response for application to said stator windings so that the speed of said rotor is continuously adjustable to thereby vary the flow rate output of said pump in response to flow conditions throughout said fluid flow system.

24. A multistation fluid flow system as recited in claim 23 wherein said means for inputting the value of said maximum flow rate is a potentiometer.

25. A multistation fluid flow system as recited in claim 24 further characterized in that said potentiometer and said microcontroller are fixed to a removable auxiliary circuit board.

26. A multistation fluid flow system as recited in claim 25 wherein said d.c. pump further comprises:
   a) a housing having a rear section; and
   b) said auxiliary circuit board is located within said rear section of said pump housing adjacent the end of said housing to facilitate reconfiguration of operation of said pump.

27. A multistation fluid flow system as defined in claim 23 wherein each of said pumps further includes:
   a) a pump head having spaced-apart inlet and outlet ports and an impeller for controlling a flow of fluid therebetween;
   b) an integral solid body of continuous molded, nonmagnetic material having a generally-cylindrical shape and a hollow interior, said body encapsulating said stator;
   c) said rotor being fixed to said impeller and including a plurality of radially-arrayed permanent magnets;
   d) the hollow interior of said solid body of molded, nonmagnetic material defining a coaxial interior cylindrical chamber permanently closed at one end and open at the opposed end for receiving said rotor;
   e) a hollow cylindrical housing; and
   f) the exterior surface of said body contacting the interior surface of said housing throughout the length of said body.

28. In a radiant heating system of the type that includes a boiler for heating fluid within a first closed conduit defining a primary heating circuit, a second closed conduit defining a secondary heating circuit including at least one radiant heating panel, a third conduit defining a fluid flow path between said primary and secondary heating circuits and means for sensing at least one environmental variable, the improvement comprising, in combination:
   a) a variable speed d.c. pump located within said third conduit for regulating the flow of fluid from said primary heating circuit into said secondary heating circuit;
   b) said d.c. pump including a rotor and at least one stator winding arranged to induce rotation thereof;
   c) means for regulating the flow of fluid through said pump fixed to said rotor;
   d) a plurality of Hall effect generators for sensing the speed of said rotor; and
   e) said pump further including (i) at least one thermistor for sensing the value of said at least one predetermined environmental variable, (ii) a plurality of potentiometers for inputting an evaluation criterion including a first potentiometer for selectively inputting the selection of either a fixed or an exterior temperature-dependent profile for fluid within said secondary heating circuit, a second potentiometer for inputting a predetermined minimum temperature of fluid flow within said primary heating circuit and a third potentiometer for inputting a selected exterior temperature-dependent heating profile for fluid within said secondary heating circuit (iii) a microcontroller for receiving said values and said evaluation criterion and generating a d.c. control signal in response thereto for application to said windings so that the speed of rotation of said rotor is continuously adjustable to thereby vary the flow rate output of said pump in response to said at least one sensed value and evaluation criterion; (iv) a pump housing; (v) a plurality of circuit boards located within said pump housing; and (vi) said plurality of potentiometers and said microcontroller being fixed to a circuit board.

* * * * *